2 Sheets—Sheet 1.

C. V. HEMENWAY, W. H. BENNETT, T. KIRK & F. W. BENNETT,

Asssignors, by mesne assignments, to W. R. SANTLEY and R. A. HORR.

Brick Machine.

No. 9,750. Reissued June 14, 1881.

Witnesses.

A. W. Decker

C. H. Kidder

Inventors.

C. V. Hemenway

F. W. & W. H. Bennett

T. Kirk

W. H. Binnings, Atty.

N. PETERS, Photo-Lithographer, Washington, D. C.

2 Sheets—Sheet 2.

C. V. HEMENWAY, W. H. BENNETT, T. KIRK & F. W. BENNETT,

Asssignors, by mesne assignments, to W. R. SANTLEY and R. A. HORR.

Brick Machine.

No. 9,750. Reissued June 14, 1881.

Witnesses.

A. W. Decker
Ch. Kidder

Inventors.

C. V. Hemenway
F. W. & W. H. Bennett
T. Kirk
W. H. Bunnage, atty.

N. PETERS, Photo-Lithographer, Washington, D. C.

UNITED STATES PATENT OFFICE.

COLLIER V. HEMENWAY, WILLIAM H. BENNETT, THOMAS KIRK, AND FRANK W. BENNETT, OF WELLINGTON, OHIO, ASSIGNORS, BY MESNE ASSIGNMENTS, TO WILLIAM R. SANTLEY AND ROLLIN A. HORR, BOTH OF SAME PLACE.

BRICK-MACHINE.

SPECIFICATION forming part of Reissued Letters Patent No. 9,750, dated June 14, 1881.

Original No. 225,283, dated March 9, 1880. Application for reissue filed May 12, 1881.

*To all whom it may concern:*

Be it known that we, COLLIER V. HEMENWAY, WILLIAM H. BENNETT, THOMAS KIRK, and FRANK W. BENNETT, of Wellington, in the county of Lorain and State of Ohio, have invented new and useful Improvements in Brick-Machines; and we do hereby declare that the following is a full, clear, and complete description thereof.

This invention relates to a machine for making bricks; and the improvement thereon consists of a device for the escape of stones and indurated lumps of clay, &c., from the machine, which, by virtue of their large size, cannot pass through the mold-openings into the molds.

A further improvement consists in a certain mechanism for moving back the mold-slide in less time than the same is moved forward for ejecting the molds from under the press.

It further relates to a device for regulating the pressure in forcing the clay into the molds, and to the peculiar arrangement and construction of the throat of the mill and the walls of the mold-openings, whereby the said molds are filled by a horizontal pressure upon the clay, said pressure being produced by the horizontal movement of a pressing-slide, instead of a direct vertical pressure heretofore used in brick-machines, all of which is fully described in the following specification, reference being had to the annexed drawings, making a part of the same, in which—

Figure 1:
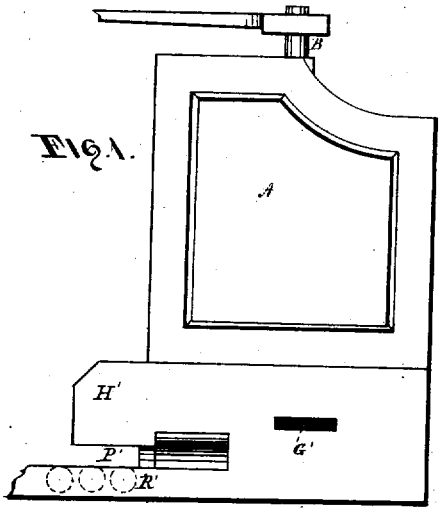
Figure 2:
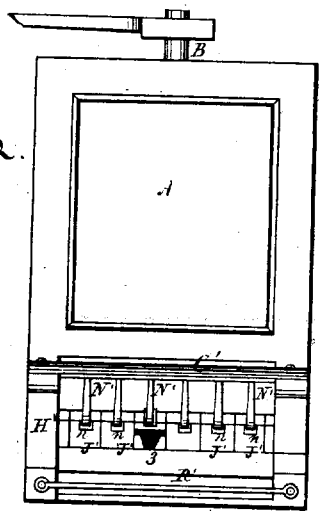
Figure 3:
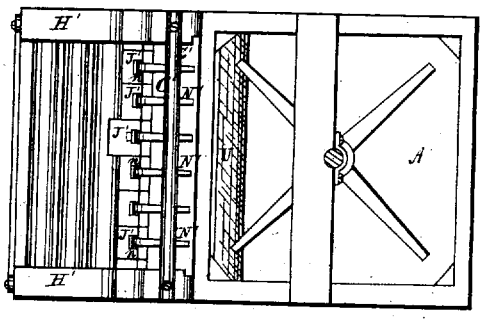
Figure 4:
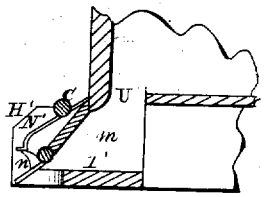
Figure 5:
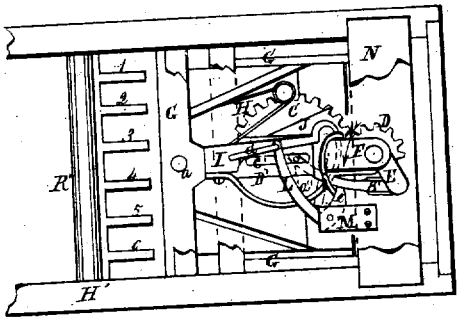
Figure 6:
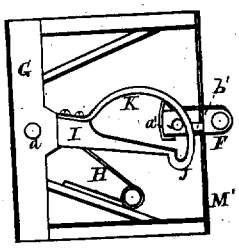
Figure 7:
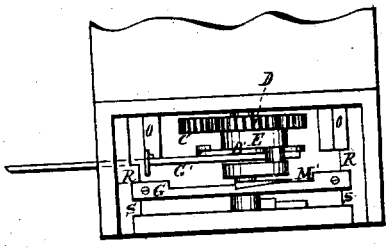
Figure 8:
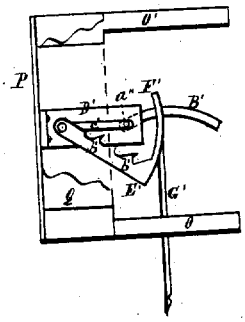
Figure 9:
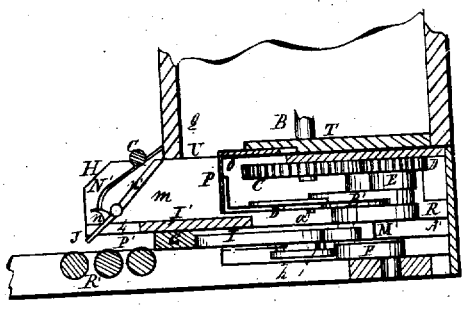

Figure 1 represents a side elevation of the machine. Fig. 2 is a front elevation; Fig. 3, a plan view; Fig. 4, a detached section; Fig. 5, a view of the under side of the machine. Figs. 6 and 8 are detached sections; Fig. 7, a rear view of the working parts of the machine. Fig. 9 is a side view of the same.

Like letters of reference refer to like parts in the several views.

Of the machine, A represents in the drawings the mill in which the clay is ground and prepared for the molds. This part of the machine is or may be like the clay-mills in ordinary use, hence a detailed description thereof will not be necessary in this place.

Under the floor of the mill is secured, to the upright shaft B thereof, a cog-wheel, C, Figs. 5 and 9, made to engage a pinion, D, fixed on the shaft of the cranks E and F, for operating the same. The two cranks together form a double crank.

To the crank F is attached the mold-slide G, Fig. 5, by means of a vibrating pitman, I, pivoted at *a* to the cross-piece or head of the slide. The connection of the pitman with the crank is not continuous, but at intervals, by means of a hook, J, terminating the end of the pitman. The point of the hook is continued to the pivoted end of the pitman, forming a loop or bow, K, Fig. 6, around the wrist of the crank. Said Fig. 6 represents a detached view of the mold-slide and pitman in their relation to the crank F, of which *a'* is the wrist.

H is a spring, one end of which is secured to the slide, whereas the other end rests against the edge of the pitman. The purpose of said pitman will presently be shown.

To the under side of the pitman is attached by a link, *d*, Fig. 5, one end of the curved lever L. Said lever is pivoted to the plate M, secured to the cross-piece N, which is reprented as broken away that the working devices may be seen. The opposite end, *e*, of the curved lever extends beyond the plate to the end of the finger *i*, projecting from the crank F, substantially as shown in said Fig. 5. Further reference will be made to this part of the work hereinafter.

The pressing device of the machine consists of the slide *o*, Fig. 9, a detached view of which is shown in Fig. 8, in which it will be seen that it is composed of the sides *o o'*. The front ends of the sides are connected to each other by a metal plate, P, and partially covered by a plate, Q, Fig. 9, which in Fig. 8 is shown as broken away, that the operative works below may be seen. Said pressing-slide is supported upon cleats R, Fig. 7. The cleats R, together with the cleats S, form a groove, A', Fig. 9, in which moves the mold-slide above described. The plate Q of the pressing-slide is fitted beneath the floor T of the mill. A portion of the edge of the floor is cut away, forming a rabbet for the plate to move in, so that on moving the pressing-slide back from the throat U, Figs. 3 and 9, it will not be pressed upon by the clay in the mill. The pressing-slide, when moved back, is shown in said figure.

The pressing-slide is operated by the crank E, to which it is connected, as follows: To the crank is attached a link or pitman, B′, Figs. 5 and 7. The opposite end of the pitman is provided with a pin, A″, adapted to fit in a slot, c′, made in the arm D′, projecting from the plate P or head of the pressing-slide, substantially as shown in said Figs. 5, 7, and 8. To the upper side of the slotted arm D′ is pivoted a catch, E′, provided with a series of notches, b′, Fig. 8. To the arm F′ of the catch is attached a rod, G′, extending therefrom to the outside of the machine, as seen in Figs. 1 and 5. The purpose of said notched catch will hereinafter be made known.

In the front of the machine, between the sides H′, is a series of mold-openings, 1 2 3, &c., Fig. 5. Said Fig. 5 represents the under side of the openings, which are a little narrower than a brick, but somewhat shorter. The upper sides of the openings are wider than the lower sides, thereby making the sides of the openings oblique, as will be seen in Fig. 2, which represents an end view of one of the openings. It will be observed that the said mold-openings are lower than the floor of the mill and forward of the throat U, as seen in Fig. 9. Immediately in the rear of the mold-openings is a plain flat surface, I′, forming a bottom to the throat U, and chamber m, and a surface over which the pressing-slide moves toward the mold-openings. It will be observed that said throat is an opening in the bottom or floor of the mill, near the front side; hence the contents of the mill will drop vertically into the chamber m, above alluded to, directly in front of the pressing-slide o, from which it is forced by the horizontal movement of the slide forward toward the front wall, n′. It will also be observed that said front wall, n′, of the chamber m is in an oblique position. The inclination of the wall is upward toward the throat U, as shown in Fig. 9. In said figure it will be seen that the inclination of the wall is such as to extend back over the mold-openings 1, 2, 3, &c. Said wall may be in a vertical position; but, however, it is preferred to have it inclined, as shown in the drawings.

In front of each of the mold-openings is hinged a drop-door, J′, Figs. 2 and 4. Said doors are kept in firm and close contact with the end of the openings by springs N′, the free ends of which rest upon nibs n, projecting, respectively, from the face of the doors, as seen in Figs. 3 and 4. The bar C′, extending across the openings, keeps them in place and prevents their slipping from the nibs.

The practical operation of the above-described machine is as follows: A nest of empty brick-molds, corresponding in number and arrangement to the mold-openings 1, 2, 3, &c., is pushed into the space P′, Figs. 1 and 9, immediately under the said mold-openings, and with which the nest of molds will be in open relation. A similar nest of brick-molds is pushed into the space P′ directly behind the nest of molds above alluded to. This second nest of molds will be under the closed plain surface I′ of the chamber m, and is pushed in while the mold-slide G is drawn back by the pitman I during the operation of the machine. The slide G, as shown in said Figs. 1 and 9, is represented as pushed forward. The nest of brick-molds under the mold-openings is filled by the clay from the mill, which passes vertically therefrom through the throat U into the chamber m in front of the pressing-slide o. The clay is forced from the chamber m through the mold-openings into the nest of brick-molds below by the now forward movement of the slide o, which forces the clay against the wall n′. This resistance of the wall tends the clay downward through the mold-openings into the molds beneath, thereby filling them by a vertical descent of the clay, caused by the horizontal movement of the pressing-slide, without any direct vertical pressure being exerted upon the clay to force it into the molds, as in ordinary brick-machines.

It will be observed that by this arrangement the clay that has been pressed into the molds will not be withdrawn by suction, as by the vertical press of the ordinary machines in use.

The throat U being in the bottom of the mill, the clay will fall therefrom into the chamber; hence no effort is required to force the clay from the mill, as is necessary when the opening or throat is in the side of the mill, as in ordinary brick-machines.

The pressing-slide o, above alluded to, is forced forward by the crank E and its connections therewith. As the slide moves forward the top Q thereof closes the throat U, thereby preventing the clay from falling from the mill while that in the chamber m is being forced into the molds, which, when full, are pushed from under the mold-openings upon the rollers R′ by the slide G, which at the proper moment, during the operation of the machine, is driven forward by the crank F and its connections therewith.

What we claim as our invention, and desire to secure by Letters Patent, is—

1. In brick-machines, the mold-slide G, provided with a pivoted vibrating pitman having a bow, K, and a hook adapted to receive the wrist of the crank F, in combination with said crank, whereby the slide is operated, substantially as described, and for the purpose specified.

2. In combination with the pitman of the mold-slide, the spring H, as and for the purpose set forth.

3. In brick-machines, the curved lever L, having the long arm thereof attached to the pivoted pitman of the mold-slide, and the short arm of the said lever arranged to engage the finger *i* of the crank for operating said slide in the manner as described, and for the purpose specified.

4. The pivoted vibratory pitman I, provided with a nib, *b'*, in combination with the shouldered cross-bar M' of the mold-slide, nib *b*, and crank, as and for the purpose set forth.

5. In brick-machines, the pressing-slide *o*, provided with a slotted arm adapted to receive the pin *a''* of the link or connecting-rod B', and having pivoted to said arm a notched catch actuated by a rod, G', in combination with the crank E of the machine, substantially as described, and for the purpose specified.

6. In the structure of brick-machines, a chamber, *m*, communicating with the mill of the machine by an opening or throat, U, in the floor of said mill above the chamber, and plate Q of the pressing-slide, for closing the throat, and actuated by the movement of the pressing mechanism, substantially as described, and for the purpose specified.

7. In brick-machines, the wall *n'* of the chamber *m*, arranged in relation to the pressing-slide, consisting of a slide, *o*, having a horizontal reciprocating movement imparted to it by the mechanism herein described and shown, whereby the clay is forced from the chamber vertically into the molds by the horizontal movement of the pressing-slide and the resultant co-operation of the said wall, substantially as set forth.

8. The combination of the doors J', springs N', molds, pressing-slide, and a chamber interposed between said molds and slide, actuated by means of mechanism constructed and arranged in the manner substantially as set forth.

COLLIER V. HEMENWAY.
WILLIAM H. BENNETT.
THOMAS KIRK.
FRANK W. BENNETT.

Witnesses:
W. F. HERRICK,
CHAS. B. MORROW.